Sept. 22, 1970          Z. KRONGOS          3,529,793
AIRPLANE WITH EMERGENCY PROPELLER AND DETACHABLE WINGS
Filed March 27, 1969          3 Sheets-Sheet 2
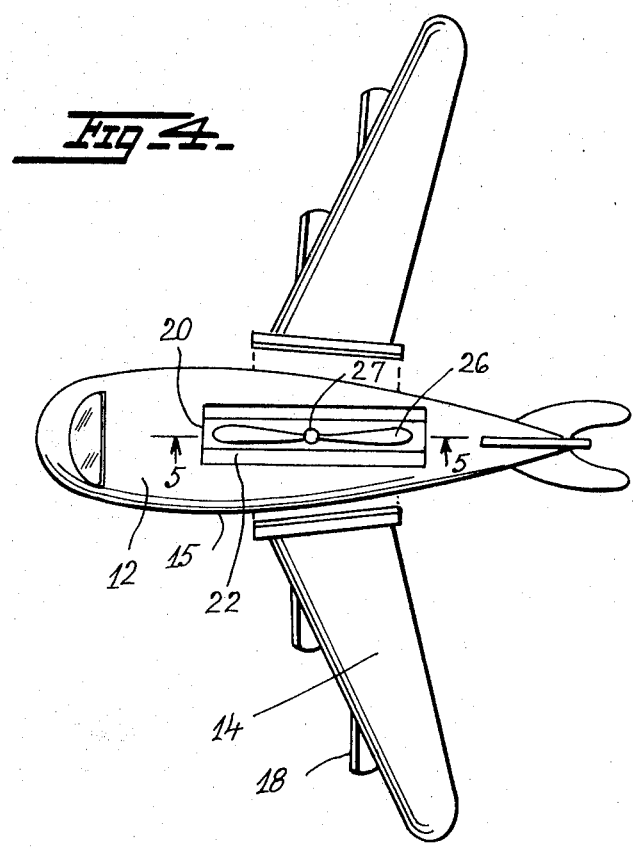
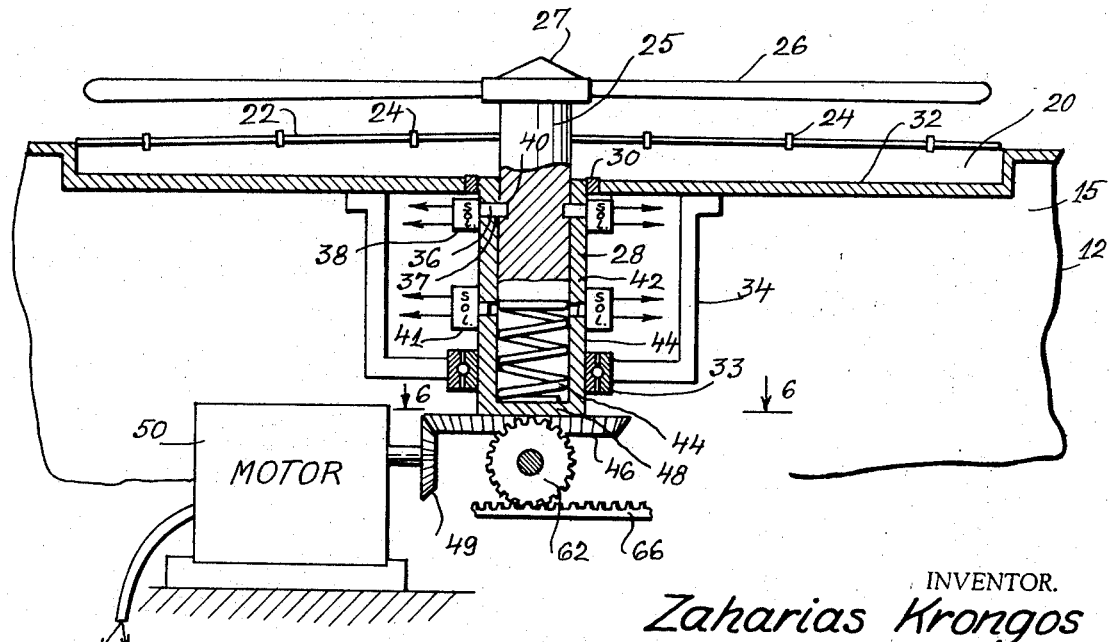
INVENTOR.
Zaharias Krongos
BY
Polachek & Saulsbury
ATTORNEYS

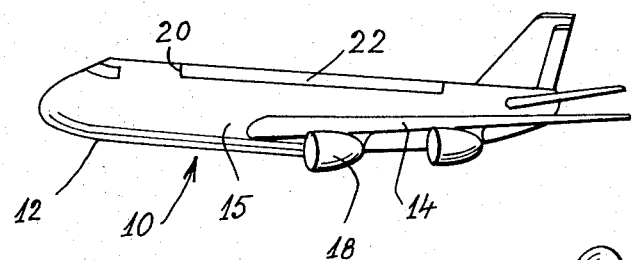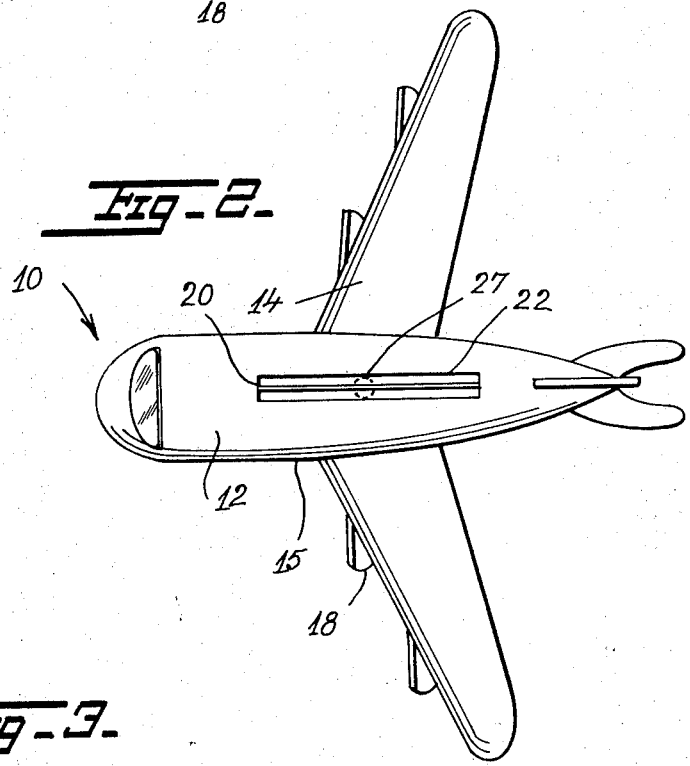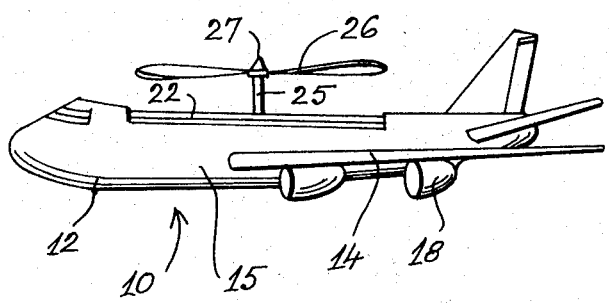

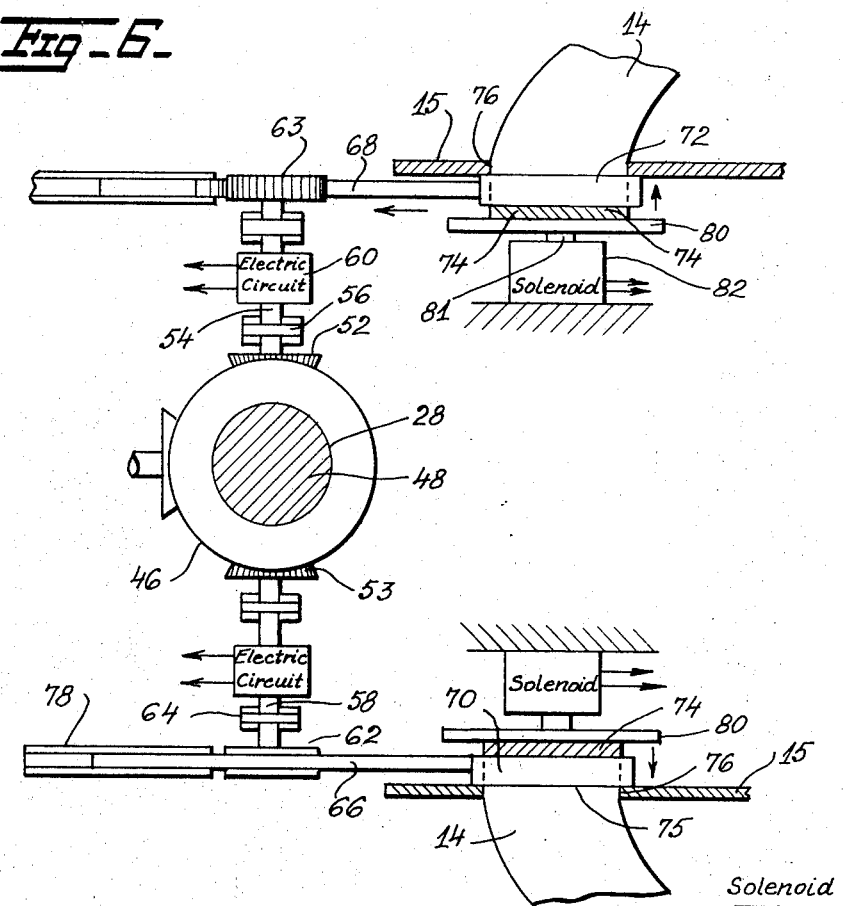
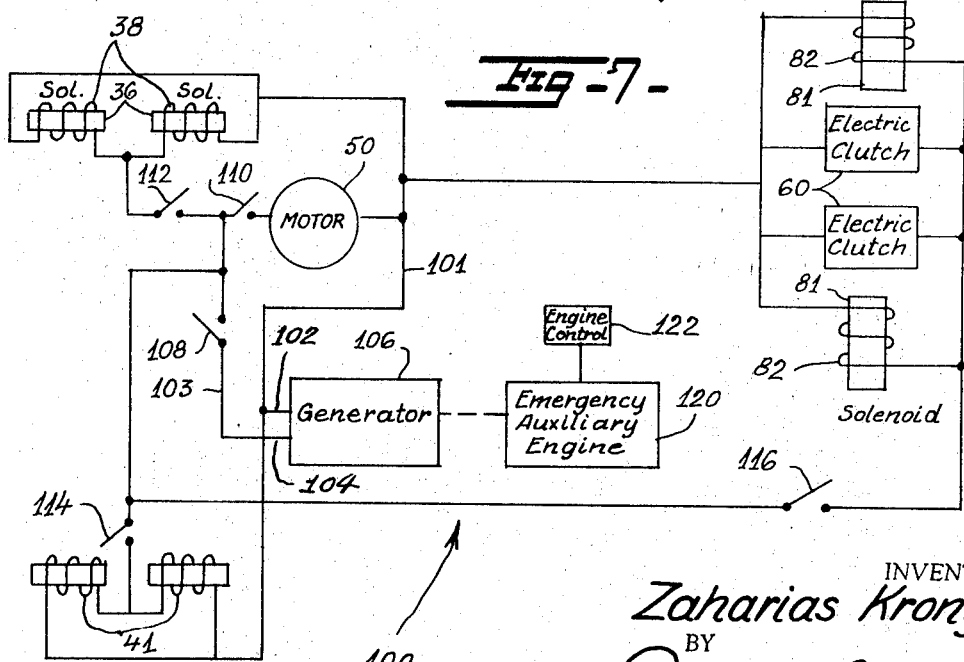

_United States Patent Office_

3,529,793
Patented Sept. 22, 1970

3,529,793
AIRPLANE WITH EMERGENCY PROPELLER AND DETACHABLE WINGS
Zaharias Krongos, 128 Sherman Ave.,
New York, N.Y. 10034
Filed Mar. 27, 1969, Ser. No. 811,019
Int. Cl. B64d 19/02
U.S. Cl. 244—139                           9 Claims

ABSTRACT OF THE DISCLOSURE

An airplane has a retracted axially vertical propeller normally concealed in its fuselage. The propeller is extended in an emergency in the event one or more engines of the airplane fails. The propeller is driven by an auxiliary motor. If the emergency is critical the wings of the airplane can be separated from the fuselage. The emergency propeller will sustain the fuselage and will enable a safe emergency landing.

---

The invention relates to safety attachments for airplanes, and more particularly concerns a jet airplane provided with detachable wings and within an emergency overhead rotary propeller.

While emergency or auxiliary overhead propellers have been proposed heretofore for use in airplanes, none has proven practical for a number of reasons. In general the prior airplanes have assumed that the main engine or engines of the airplane will remain operative during an emergency, and the auxiliary overhead rotor will be driven by the main engine. If the main engine or engines fail, the auxiliary propeller becomes inoperative.

In the present invention there is provided an auxiliary propeller which operates independently of the main engines. If necessary the main engines carried on the wings of the airplane can be jettisoned along with wings. The relatively light fuselage will then be sustained by the emergency rotary propeller alone and can make a safe emergency landing.

The invention will be explained in further detail in connection with the drawing, wherein:

FIG. 1 is a side view of an airplane embodying the invention.

FIG. 2 is a top plan view of the airplane.

FIG. 3 is a side view of the airplane with emergency rotary propeller shown extended.

FIG. 4 is a top plan view of the airplane with emergency rotary propeller extended and with wings shown detached.

FIG. 5 is an enlarged sectional view partially diagrammatic in form taken on line 5—5 of FIG. 4, showing mechanical details of the emergency rotary propeller.

FIG. 6 is a horizontal sectional view partially diagrammatic in form showing the arrangement for releasing the wings from the fuselage.

FIG. 7 is a diagram of an electric circuit employed in the airplane.

Referring to the drawing, there is shown in FIGS. 1–4 an airplane 10 having an elongated streamlined fuselage 12 arranged to carry passengers in conventional fashion. Wings 14 extend laterally from side walls 15 of the fuselage and carry jet engines 18. To the extent described, the airplane is conventional.

Now according to the invention, a long shallow well 20 is provided in the top of the fuselage (see FIG. 5). The well is closed by a pair of long doors 22 which pivot on snap spring loaded hinges 24 at their outer edges. Located in the well just below the doors is an axially vertical rotary shaft 25 carrying propeller 26. At the top of shaft 25 is a conical projection 27 which abuts the undersides of the doors and facilitates opening the doors when the shaft is extended. When the shaft is extended the doors snap open and remain in open position as shown in FIGS. 3 and 4.

Shaft 25 is axially movable in a sleeve shaft 28. Shaft 28 rotates in a bearing ring 30 at bottom wall 32 of well 20. Shaft 28 is further supported by ball bearing races 33 carried by brackets 34 secured to the underside of wall 32. Shaft 25 is shown extended from sleeve shaft 28 in FIG. 5. Plungers 36 of two solenoids 38, disposed in diametrically opposed positions on shaft 28, extend through holes 37 in shaft 28 and engage in recesses or blind bores 40 formed in opposite sides of shaft 25. Plungers 36 support shaft 25 and propeller 26 in extended elevated position. Located below solenoids 38 are two other solenoids 41 whose axially aligned plungers 42 are retracted in holes 44 in shaft 28. Normally shaft 25 is retracted in shaft 28 and coil spring 44 under shaft 25 is compressed. Plungers 42 are then engaged in recesses 40. When solenoids 38 and 41 are actuated, plungers 42 are retracted. Coil spring 44 then lifts shaft 25 upwardly until plungers 36 engage in recesses 40 to hold the shaft 25 elevated. Shaft 25 rotates with sleeve shaft 28.

A bevel gear 46 is attached to the bottom wall 48 of shaft 28. Gear 46 is engaged with drive gear 49 of motor 50. When the motor is energized gears 46, 49 turn shafts 25, 28 and the elevated propeller 26 rotates. Motor 50 and solenoids 38, 41 are connected in circuit 100 shown in FIG. 7, described below.

Two further bevel gears 52, 53 shown in FIG. 6 are engaged with gear 46 at opposite sides thereof. Gears 52, 53 are axially aligned and are carried by shafts 54 journaled in bearings 56. Shafts 54 are connected via electrically operated magnetic clutches 60 to shafts 58 which carry spur gears 62, 63 at their outer ends. Shafts 58 are journaled in bearings 64. Gears 62, 63 are engaged with horizontal rack gears 66, 68. Latch bars 70, 72 are attached to ends of the rack gears. Latch bars 70, 72 engage hooked flanged ends 74 of the lateral wings 14 of the airplane. The inner ends 75 of the wings extend through long openings 76 in side walls 15 of the fuselage. The rack gears move slidably in guide channels 78 and withdraw the latch bars from the ends of the wings to release the wings. The wings are shown released in FIG. 4. When the wings are released, plates 80 which abut flanges 74 are advanced by plungers 81 of solenoids 82 to help push the wings free from the fuselage. When plates 80 are fully advanced they close openings 76 in the side walls 15 of the fuselage. Clutches 60 and solenoids 82 are connected in circuit 100 shown in FIG. 7 to which reference is now made.

Motor 50 is connected via wire lines 101, 103 to power output terminals 102, 104 of an electrical generator 106. Switch 108 in line 103 switches off voltage from generator 106. Switch 110 at motor 50 turns the motor on and off. Solenoids 38 are connected in parallel to lines 101, 103 via a switch 112. Solenoids 41 are connected to lines 101, 103 via switch 114. The generator 106 is driven by an emergency auxiliary engine 120 provided with its own fuel supply in the fuselage of the airplane. The engine is turned on by an appropriate control device 122. The electrically operated magnetic clutches 60 and solenoids 82 are connected in parallel to lines 101, 103 via a switch 116.

All switches and controls are arranged and disposed for convenient instant operation by the pilot of the airplane. Suppose the pilot notes that the airplane is losing altitude and needs supplementary lift. He will start engine 120 and close switches 108, 110, 112 and 114. Plungers 42 holding shaft 25 will retract and plungers 36 will be extended to engage in recesses 40 as the shaft 25 rises. Doors 20 will be opened by projection 27 on shaft 25 and will remain open. The propeller will be driven by the activated motor 50.

Suppose a serious or critical emergency develops such as a fire in a wing 14 or in one or more of engines 18 which threatens the safety of the airplane and passengers. The pilot can jettison the wings 14 and engines 18 by closing switch 116. This will actuate the clutches to cause the rack gears to be driven by gear 46 via gears 52, 53 and 62, 63. At the same time, the solenoids 82 will be activated to help eject the wings and to close the side openings in the fuselage. The rotating propeller 26 will serve to sustain the fuselage for a relatively short flight to a nearby airport or landing field or will enable a safe emergency descent to the ground.

The system described can be applied to civilian and military aircraft. It can be installed in existing airplanes or embodied in aircraft at the time of original manufacture. In any case, the system insures the safety of passengers and safe landing of the fuselage, passengers and cargo.

What is claimed is:

1. An aircraft having an elongated axially horizontal fuselage; wings extending laterally from opposite sides of the fuselage; walls defining a well in the top of the fuselage; hinged doors closing the well; a propeller in the well; an axially vertical shaft in the fuselage extending through the well and carrying the propeller; a sleeve concentric with the shaft and rotatably supporting and rotating with the shaft; a motor in the fuselage; gear means operatively interconnecting said motor and sleeve to drive the sleeve and propeller; means for extending the shaft in the sleeve to raise the propeller and open the doors; and electrically controlled solenoids having plungers for engaging the shaft to keep the shaft in either a retracted or an extended position respectively.

2. An aircraft as defined by claim 1, further comprising an engine in the fuselage; and an electrical generator connected between the engine and motor for energizing the same to drive the propeller.

3. An aircraft as defined by claim 1, wherein the fuselage has openings in opposite sides thereof, said wings having inner ends extending through said openings; and means in the fuselage for releasing said wings to jettison the same.

4. An aircraft as defined by claim 1, wherein the fuselage has openings in opposite sides thereof, said wings having inner ends extending through said openings; catch members engaging the inner ends of the wings; and means for actuating the catch members to release the wings from the fuselage.

5. An aircraft as defined by claim 4, further comprising a pair of movable plates disposed adjacent said inner ends of the wings respectively, for closing said openings and for assisting in releasing the wings from the fuselage; and solenoid means arranged to advance the plates to close said openings in the sides of the wings.

6. An aircraft as defined by claim 4, further comprising other gear means operatively arranged between the motor and catch members and driven by said motor to disengage the inner ends of the wings.

7. An aircraft as defined by claim 2, wherein the fuselage has openings in opposite sides thereof, said wings having inner ends extending through said openings; catch members engaging the inner ends of the wings; and means for actuating the catch members to release the wings from the fuselage.

8. An aircraft as defined by claim 7, further comprising a pair of movable plates disposed adjacent said inner ends of the wings respectively, for closing said openings and for assisting in releasing the wings from the fuselage; and solenoid means arranged to advance the plates to close said openings in the sides of the wings, the last named solenoid means being connected in circuit with said generator for obtaining electric power therefrom.

9. An aircraft as defined by claim 8, further comprising gear drive means operatively arranged between the motor and catch members and driven by the motor to disengage the inner ends of the wings; and electrically operated clutches interposed in said gear drive means for driving the catch members only when the clutches are energized; and means connecting said clutches to said generator for obtaining electric power therefrom.

References Cited

UNITED STATES PATENTS

| 2,227,204 | 12/1940 | Sepko | 244—139 |
| 2,665,093 | 1/1954 | Manfredi et al. | 244—139 |
| 2,934,294 | 4/1960 | Faibusch | 244—139 |
| 3,227,399 | 1/1966 | Dastoli et al. | 244—140 |

FOREIGN PATENTS 1,154,116  10/1957  France.

MILTON BUCHLER, Primary Examiner

J. E. PITTENGER, Assistant Examiner